Patented Aug. 31, 1948

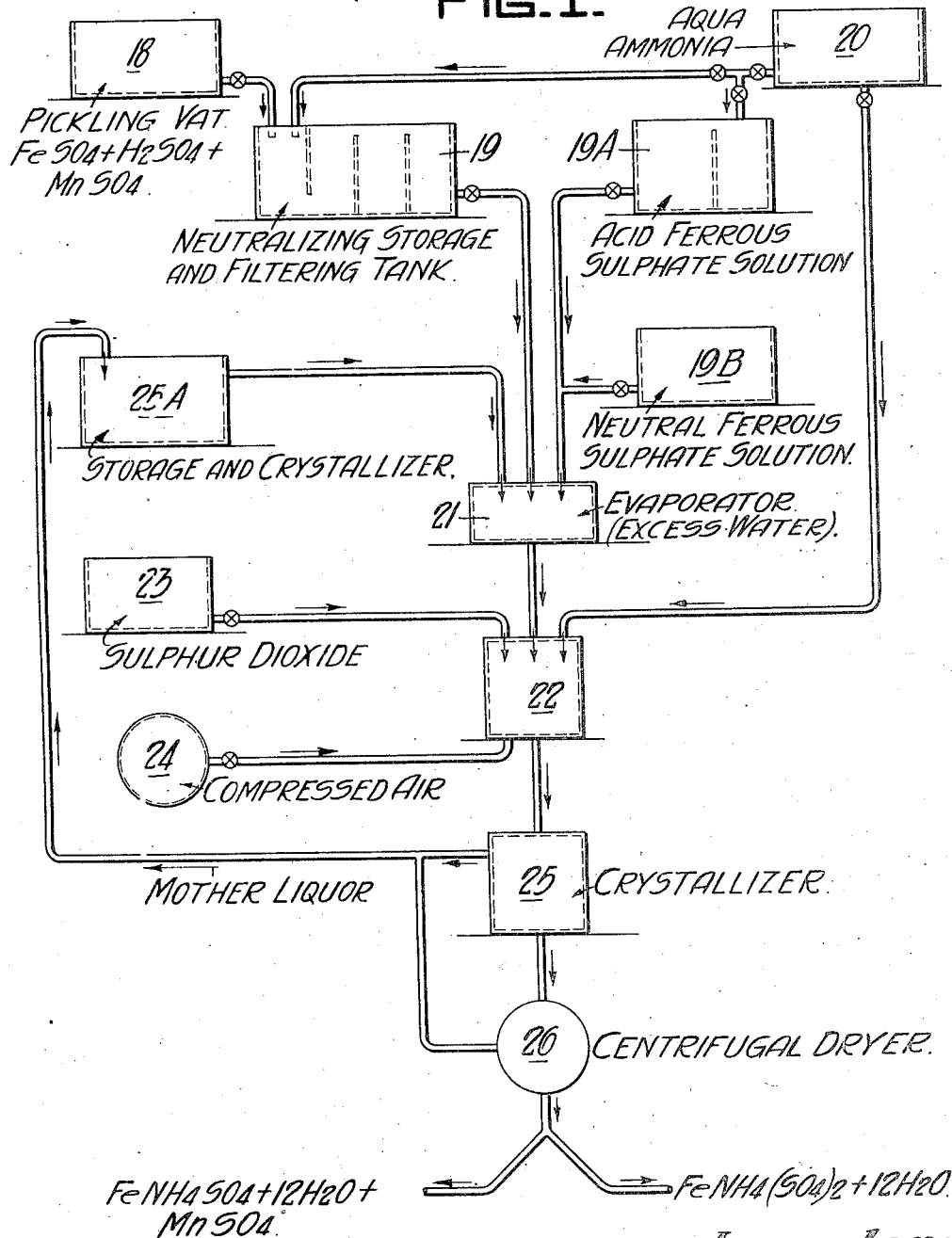

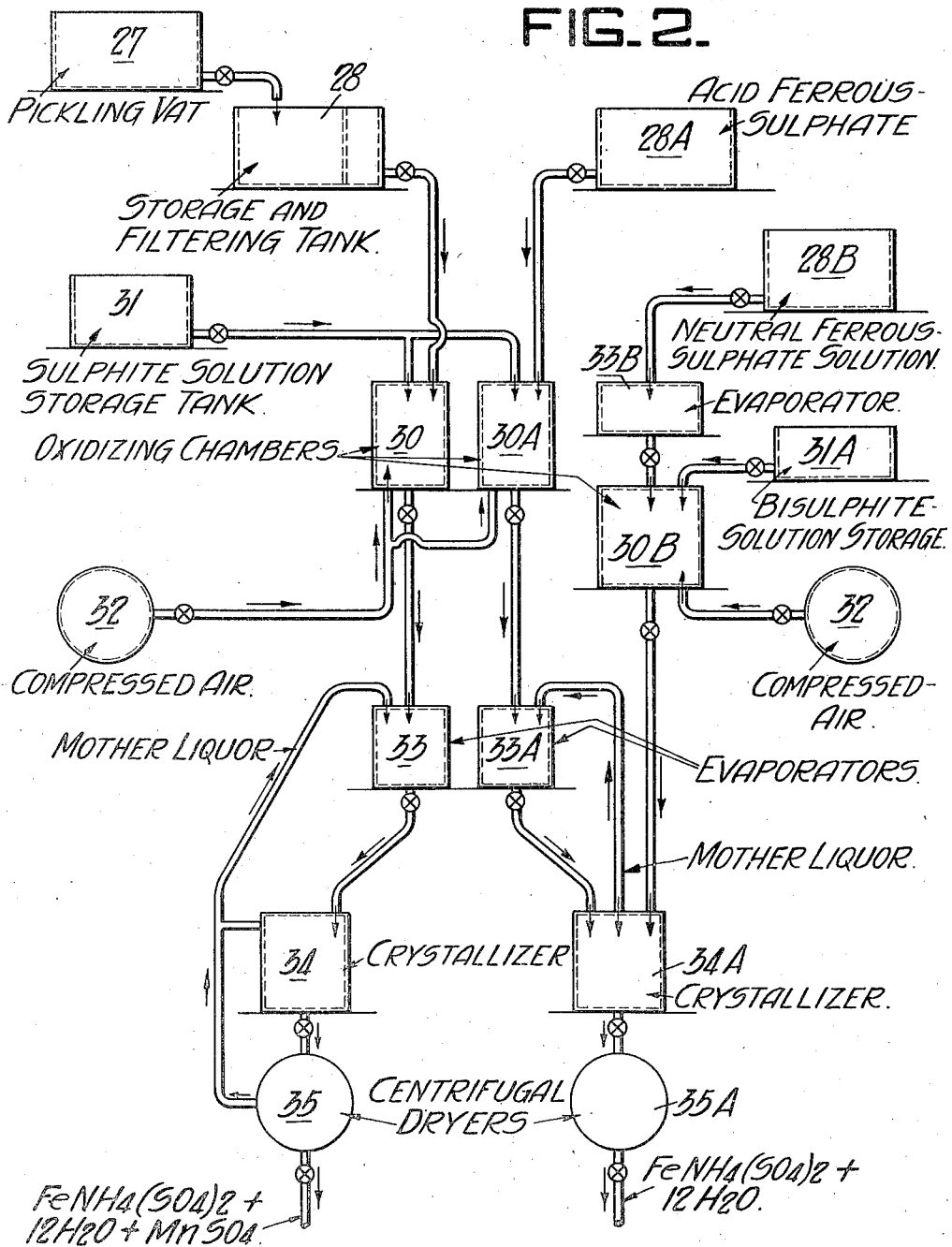

2,448,425

UNITED STATES PATENT OFFICE 2,448,425

PROCESS FOR THE UTILIZATION OF FERROUS SULFATE SOLUTIONS IN THE MANUFACTURE OF FERRIC ALUMS

Charles B. Francis, Pittsburgh, Pa.

Application January 30, 1947, Serial No. 725,402

9 Claims. (Cl. 23—118)

This invention is a division of my copending application, Serial No. 482,460, filed April 9, 1943, now Patent No. 2,416,744, and relates to the manufacture of dibasic sulphates, such as ferric ammonium sulphate, from ferrous sulphate. More particularly, it relates to a process for utilizing spent pickling acid and crude gas or coke works ammonia to produce either commercially pure ferric ammonium sulphate commonly known as ferric ammonium alum or certain other ferric alums such as ferric sodium alum, pure ammonia and ferric hydroxide.

Spent pickling acid is produced in the cleaning, or pickling, with sulphuric acid of steel articles, such as sheets and wire, that are to be cold formed or coated with another metal, and represents a crude solution, heretofore considered as a waste product from steel plants, containing 2% to 7% free sulphuric acid and 10% to 30% ferrous sulphate as principal ingredients and, in addition, smaller proportions of insoluble substances consisting of organic matter, traces of ferric sulphate and the salts of various metals, such as manganese, that were alloyed with the steels pickled.

Likewise, crude aqua ammonia as obtained from the ammonia stills of by-product coke and gasworks represents a complex solution of various ammonium compounds as the principal constituents, mainly ammonium hydroxide and ammonium carbonate with smaller percentages of ammonium sulphides and cyanides and numerous organic compounds in still smaller proportions.

The crude aqua ammonia I prefer in the operation of my process contains from 15% to 25% total ammonia, expressed as per cent $NH_3$ by weight, and is known as "concentrated liquor," obtained by treating "weak liquor" with calcium hydroxide in ammonia stills. The "concentrated liquor" produced by coke works usually contains about 18% total ammonia.

Because the iron in the spent pickling acid is in the ferrous condition and the crude aqua ammonia contains acid radicals which form soluble compounds with ferrous iron, all of the latter cannot be precipitated and separated by adding ammonia to the spent acid directly, nor can other bases be used to accomplish this object. If the ferrous sulphate in the spent acid is oxidized to ferric sulphate, however, all the iron is readily precipitated by ammonia and several other bases, giving ferric hydroxide, which is insoluble and can be separated from the solution of sulphate containing the metal substituted for iron. Of the many known ways of oxidizing ferrous sulphate in solution, all of them are too costly to be commercially applicable to the treatment of spent pickling acid for the production of other sulphates. However, in studying these methods, I have found that the known process of oxidizing ferrous sulphate with sulphur dioxide and air may be modified to make it practicable for the commercial utilization of spent pickling acid and crude concentrated coke works ammonia in the manufacture of other sulphates, particularly ferric ammonium sulphate, which may be used to produce other sulphates, pure ammonia and a ferric hydroxide that may be applied to many purposes. Other bases which may be substituted for ammonia in the treatment of the spent acid to produce sulphates include the hydroxides or oxides of lithium, potassium, sodium, magnesium, uranium, aluminum, manganese, zinc, cadmium, cobalt, and nickel.

However, in the following description of my process, I shall employ crude cokeworks ammonia as an example of the bases which may be used in the initial (neutralizing and oxidizing) steps of my process, although the utilization of spent pickling acid for the manufacture of ferric ammonium sulphate has been one of the chief objects of my invention.

In experimenting with this method of oxidizing ferrous sulphate solutions a fourth discovery I have made is that sulphites, such as ammonium sulphite or ammonium bisulphite, may be substituted for the sulphur dioxide, if added to the ferrous sulphate solution gradually at a rate that will not lower the hydrogen ion concentration of the solution below pH 5. The sulphites are added, most conveniently in the form of concentrated solutions, the only requirement being that the sulphite used must contain the base of the sulphate desired.

Thus, with a supply of a given base and by slight modification in my process and some omissions or additions of equipment, I may start with acid or neutral solutions of ferrous sulphate, oxidize the ferrous sulphate to ferric sulphate by the use of sulphur dioxide or sulphites and air to produce either ferric alum or a sulphate of the given base and ferric hydroxide. As the use of spent pickling acid and crude cokeworks ammonia to produce ferric ammonium sulphate is the chief object of the invention, I shall first describe in detail how I accomplish this object by the use of sulphur dioxide and air to oxidize the ferrous sulphate.

By the known process of oxidizing ferrous sulphate in solution with sulphur dioxide and air, the two reactions following take place simultaneously as soon as a certain proportion of the ferrous sulphate has been oxidized to ferric sulphate, the latter apparently acting as a catalyst to both reactions:

1. $2FeSO_4 + SO_2 + O_2 \rightarrow Fe_2(SO_4)_3 + 132$ Cal.
2. $2SO_2 + 2H_2O + O_2 \rightarrow 2H_2SO_4 + 113.3$ Cal.

In the presence of much free sulphuric acid, say 4% or more, or in the presence of small percentages of manganese sulphate, which also acts as a catalyst in reaction 2, reaction 1 progresses very slowly, so that this method for oxidizing iron cannot be commercially applied directly to the spent pickling acid for oxidation of the ferrous sulphate it contains. I have found, however, that if the acidity of the spent acid solution is adjusted to between approximately pH 2 and pH 4, pH 2 to prevent the precipitation of ferric iron and pH 4 to prevent the precipitation of ferrous iron (hereinafter described as neutral) with ammonia or certain ammonium compounds, such as ammonium carbonate, ammonium sulphide or sulphite, that react with sulphuric acid to give a gaseous product, reaction 1 progresses to the complete oxidation of the iron. I have further discovered that the crude aqua ammonia obtained in the coking of coal and the manufacture of coal gases, or the vapors as they come from the ammonia stills regularly employed in the by-product coke industry, may be used for the purpose of neutralizing the free acid and precipitating the iron and other metals in the spent acid that may be separated by hydrolysis. Again, in applying the known method to the oxidation of ferrous sulphate in spent pickling acids, reaction 1 progresses only to the oxidation of about half the iron in relatively concentrated solutions containing 15% or more ferrous sulphate, when reaction 2 begins, forming free acid which may again retard or halt entirely the progress of reaction 1, and this defect I have found is also overcome by adding ammonia in proportion to the acid formed.

Again, as the proportion of ferric sulphate increases and reaction 2 is catalyzed, there is danger, particularly if the sulphur dioxide ($SO_2$) is fed into the solution too fast for the following reaction to occur:

3. $Fe_2(SO_4)_3 + SO_2 + 2H_2O \rightarrow$
$2FeSO_4 + 2H_2SO_4 + 279$ Cal.

This reaction, in which the $SO_2$ acts as a reducing agent, is well known and frequently employed, particularly in analytical chemistry. I have found that if ammonia is introduced under proper conditions into the oxidation cell, that is, the chamber in which the oxidation of the ferrous sulphate is being carried out, the acid formed by reaction 2 may be kept neutralized and reaction 3 prevented from occurring, except when the $SO_2$ is fed at a rate out of proportion to the available oxygen as required by reactions 1 and 2.

All three of these reactions are exothermic and progress most rapidly at a temperature between 50° and 60° C. Consequently, the oxidation of the ferrous sulphate is slow at the beginning, but eventually enough heat is generated in the solution to heat it to the optimum temperature and the reaction progresses most rapidly.

I have also found that ammonia may be used to accomplish another object with advantage to the process, explained as follows:

During the operation of an oxidation cell for the oxidation of a given amount of a solution of ferrous sulphate, a certain small proportion, varying from 1 to 5%, of the $SO_2$ escapes, particularly at the beginning of the process when the proportion of ferric sulphate is low. The loss of this $SO_2$ is prevented by scrubbing the air escaping from the cell with a dilute solution of ammonia or a more concentrated solution of ammonium sulphite containing a little ammonia. The resultant solution of ammonium sulphite may be added to the solution in the oxidation cell where the ammonium sulphite may react with the ferric sulphate to form ammonium sulphate, ferrous sulphate and sulphuric acid according to reaction 4.

4. $Fe_2(SO_4)_3 + (NH_4)_2SO_3 + H_2O \rightarrow$
$(NH_4)_2SO_4 + 2FeSO_4 + H_2SO_4 + 85$ Cal.

If free sulphuric acid is present, the ammonium sulphite reacts with it to form ammonium sulphate, which is a soluble salt, sulphur dioxide which is a gas, and water which is a non-electrolyte according to the following reaction:

5. $H_2SO_4 + (NH_4)_2SO_3 \rightarrow$
$(NH_4)_2SO_4 + SO_2 + H_2O - 59.8$ Cal.

With an excess of diffused air fed to the oxidation cell, the ferrous sulphate and sulphur dioxide formed by reactions 4 and 5 respectively are immediately oxidized in accordance with reactions 1 and 2. These reactions are important in the operation of the process, as they must be controlled to give the product desired.

After as much as 99% or more of the ferrous sulphate in the spent pickling acid has been oxidized as described above, the oxidized solution is preferably drawn out of the oxidation cell and transferred to another vessel where it may be treated, in the event that there is an excess of ferric sulphate present, with pure ammonia to precipitate the iron in accordance with the following reaction:

6. $Fe_2(SO_4)_3 + 6NH_4OH \rightarrow$
$Fe(OH)_3 + 3(NH_4)_2SO_4 + 3H_2O$

The excess iron is precipitated to adjust the proportion of ammonium sulphate to ferric sulphate to form ferric ammonium sulphate $[(NH_4)_2SO_4.Fe_2(SO_4)_3]$ The completeness of the oxidation of the ferrous sulphate depends largely upon the purity of the ammonia available. With pure ammonia, I may prefer to oxidize 100% of the iron, but as complete oxidation of the iron requires additional time out of proportion to the iron oxidized earlier in the process and crude ammonia contains substances that reduce ferric sulphate, I prefer to leave some unoxidized iron in the solution before adding crude ammonia to precipitate the iron.

Crude ammonia contains, besides other impurities, sulphides and cyanides which reduce ferric sulphates. The sulphides react with ferrous and ferric sulphates as follows:

7. $Fe_2(SO_4)_3 + 3(NH_4)_2S \rightarrow$
$3(NH_4)_2SO_4 + Fe_2S_3$ or $2FeS + S$
8. $FeSO_4 + (NH_4)_2S \rightarrow (NH_4)_2SO_4 + FeS$ As is indicated by reaction 7, ammonium sulphide in reacting with ferric sulphate may, under certain circumstances, give free sulphur, which may cause trouble by remaining in colloidal solution or by reacting with cyanide to form sulphocyanides (thiocyanates) which, in turn, react with ferric sulphate to form soluble iron compounds. With some ferrous sulphate present the cyanides react with the ferrous and ferric sulphates to form insoluble cyanides and the free sulphur formed in reaction 7 is less troublesome because at least part of it may be entrapped by the ferric hydroxide and separated with the latter upon filtering.

In my process the ammonium carbonate $(NH_4)_2CO_3$ contained in the crude aqua ammonia serves a purpose similar to ammonium hydroxide, because the conditions are such that the carbonate is decomposed, forming ammonium sulphate and carbon dioxide, which, being a gas, is carried out of the solution with the other gases or forced out by heat.

Having thus explained my discoveries relating to the steps of neutralizing the free acid with ammonia and of oxidizing the ferrous sulphate with sulphur dioxide and air, I desire to describe how to apply my next discovery, namely, that solutions of sulphites, particularly ammonium sulphite, may be substituted for sulphur dioxide. This discovery is important, because the solutions of the sulphites are more easily handled and controlled than the gaseous sulphur dioxide, and it also permits the utilization of sulphur dioxide from many sources, such as chimney gases, gases from the calcination of waste sulphur bearing materials, etc., from which the sulphur dioxide may be recovered as sulphites by scrubbing the waste gases with dilute ammonia or soda solutions.

Using the ammonium sulphites as an example, the principles of this modification of my invention are most briefly explained by the following reactions:

With acid sulphate solutions the ammonium sulphites first react with the free acid present, thus:

9. $H_2SO_4 + (NH_4)_2SO_3 \rightarrow (NH_4)_2SO_4 + H_2O + SO_2$
10. $H_2SO_4 + 2NH_4HSO_3 \rightarrow (NH_4)_2SO_4 + 2H_2O + 2SO_2$ With diffused air being introduced into the solution, the sulphur dioxide thus liberated reacts with oxygen and ferrous sulphate to produce ferric sulphate in accordance with reaction 1. In applying reaction 9, it should be noted that a minimum of free acid in relation to the ferrous sulphate must be present, the exact proportion being given by the reaction:

11. $H_2SO_4 + (NH_4)_2SO_3 + 2FeSO_4 + O_2 \rightarrow$
   $Fe_2(SO_4)_3 + (NH_4)_2SO_4 + H_2O$ Excess free acid results in the formation of acid ammonium sulphate (as in reaction 12), which, when fully neutralized, will give ammonium sulphate in excess over that required to form ferric ammonium alum, thus:

12. $2H_2SO_4 + (NH_4)_2SO_3 + 2FeSO_4 + O_2 \rightarrow$
   $Fe_2(SO_4)_3 + 2NH_4HSO_4 + H_2O$ To avoid precipitation of part of the iron as a hydrated ferric oxide, neutral ferrous sulphate solutions require ammonium bisulphite in the oxidation step, this being represented by reaction 13:

13. $4FeSO_4 + 4NH_4HSO_3 + 3O_2 \rightarrow$
   $2Fe_2(SO_4)_3 + 2(NH_4)_2SO_4 + 2H_2O$ From the preceding descriptions, it will be observed that the oxidized solutions represent mixtures of ammonium and ferric sulphates and, if the percent of free acid in the spent pickling acid is approximately one-third of the per cent of ferrous sulphate, as it generally is, these salts are in proper proportion to form ferric ammonium alum, $FeNH_4(SO_4)_2 + 12H_2O$ or $Fe_2(SO_4)_3 \cdot (NH_4)_2SO_4 + 24H_2O$ This double salt is very soluble in warm water—about 400 grams in 100 grams of water at 100° C.—but much less soluble in cold water—only about 100 grams being soluble in 100 grams of water at 20° C. Consequently, if about one-half of the water originally present in the spent pickling acid is evaporated, the double salt will crystallize at room temperature. If the solution is cooled to some temperature below 10° C., from one-half to two-thirds of the double salt will crystallize without evaporative treatment. With neutral ferrous sulphate solutions oxidized with sulphur dioxide and air or bisulphites and air, the evaporation of the excess water may be effected prior to oxidizing; but where sulphites are used the evaporation is done by preheating the air that is diffused into the solution in the oxidizing cell, or preferably in a separate operation in which the solution is sprayed through preheated air contained in a wooden or a lead lined steel vessel. In either case the solution is transferred to a crystallizing tank in which it is permitted to cool and from which the crystals are removed and separated from the mother liquid by conventional means.

This double salt may be used to advantage to prepare ferric sodium sulphate as a substitute for alum in water treating as well as for many other purposes. To prepare ferric sodium sulphate, the ferric ammonium sulphate is dissolved in ¼ to ⅓ its weight of boiling water and to the hot solution is added an amount of sodium hydroxide equivalent to the ammonia present, and the mixture is heated to boiling to liberate ammonia and form ferric sodium alum according to the following reaction:

14. $FeNH_4(SO_4)_2 + NaOH \rightarrow$
    $FeNa(SO_4)_2 + H_2O + NH_3$

It is to be noted that the ammonia thus obtained is commercially pure, being contaminated only by the water vapor that distills, with which it combines to form ammonium hydroxide. In the purification of crude coke works ammonia, it is treated with calcium and sodium hydroxides and redistilled, but no by-products of value are recovered. Therefore, the present invention represents a novel process for the production of pure ammonia and ammonium hydroxide from crude coke works ammonia.

If preferred, the oxidized solution may be used for the production of ammonium sulphate and ferric hydroxide or oxide. If the latter product is desired, the oxidized liquor is treated as already described for the production of ammonium sulphate.

The reactions by which I produce ferric ammonium alum in at least five modifications of the process of my invention are as follows:

*Alum from acid and neutral ferrous sulphate solutions oxidized with sulphur dioxide and air*

15. $H_2SO_4 + 2NH_4OH + 2FeSO_4 + SO_2 + O_2 \rightarrow$
    $2FeNH_4(SO_4)_2 + 2H_2O$ According to reaction 15, the free sulphuric acid must be nearly one-third of the ferrous sulphate, by weight, and adjustment of the free acid in the ferrous sulphate solution to give thirty parts of ferrous sulphate to nine parts of free acid to allow for the acid formed later in the oxidation step is one way by which I may successfully produce ferric ammonium alum. However, since it is possible to produce acid as shown by reaction 2, alum may be produced from any solution containing ferrous sulphate and less than one-third as much free acid. In operating my process in accordance with this second procedure with free acid or with neutral solutions of ferrous sulphate, I pass sulphur dioxide, air, and ammonia into the oxidizing chamber until, as shown by analysis, the sulphates are in correct proportions to form ferric alum. If the excess water has previously been evaporated, this point can be detected by a rapid analysis for ammonia which should be 3.5% by weight of the solution.

Figure 1 is a flow sheet illustrating my invention; and

Figure 2 is a flow sheet similar to Figure 1, but in which sulphites are substituted for sulphur dioxide.

Referring to Figure 1 of the drawings, the reference numeral 18 represents a pickling vat; 19 a combination neutralizing and filtering tank for spent pickling acid; 19A a neutralizing and storage tank as is used for other acid ferrous sulphate solutions; 19B a storage tank as is used for neutral ferrous sulphate solutions; 20 a storage tank for a supply of the solution of the base to be used, e. g., aqua ammonia; 21 evaporating equipment, preferably multiple effect; 22 a tank or chamber in which the ferrous sulphate solutions are oxidized; 23 any source of supply of sulphur dioxide gas; 24 an air compressor; 25 a cooling and crystallizing tank of conventional design; 26 a centrifugal dryer and 25A a storage and crystallizing tank supplementing 25, particularly for the processing of spent pickling acid and similar substances that may be partially or wholly purified by crystallization. In such latter solutions, the impurities concentrate in the mother liquor, and this plant layout provides for running the mother liquor through the evaporators separately if desired.

From the flow sheet, it is apparent that the various steps in this modification of my process are as follows:

The acid ferrous sulphates are just neutralized with the base of the non-ferrous sulphate desired and, if necessary, are freed of insoluble matter. The neutral sulphate solutions are next evaporated to leave them in solution in a quantity of water equal to that required to keep them in solution at 60° C.

As the iron is most quickly determined, I use it as an index and aim to obtain a certain number—between 10 and 14—of grains of iron per 100 c. c. of solution, the exact proportions depending upon whether or not there are impurities which it is desirable to separate by crystallization. In processing commercially pure ferrous sulphate solutions to ferric ammonium alums, the total water should be equal to the weight of the salt including the water of crystallization. The solution is then transferred to the oxidizing chamber where the ferrous sulphate is oxidized with sulphur dioxide and air, as previously described. The end point at this stage is determined by titrating a small portion for ferrous iron, as in a chemical determination of iron.

After substantially all of the iron has been oxidized, the cell 22 is operated to produce acid as required, at the end of which period the hydrogen ion concentration of the solution is adjusted to pH2, and the solution is transferred to a crystallizing tank. Here it is cooled to a temperature between 10° and 20° C. and the crystals are separated from the mother liquor in which the impurities are found in more concentrated form. Some impurities, such as manganese sulphate, tend to crystallize with the ferric alums so that a sharp separation cannot be obtained in one crystallization, as indicated on the flow sheet.

*Alum from acid and neutral ferrous sulphate solutions, oxidized with sulphites*

A modification of my process for using ferrous sulphate solutions for the manufacture of ferric alum in which sulphites are substituted for sulphur dioxide is shown in Figure 2, which is a flow sheet indicating the various steps for treating acid ferrous sulphate and neutral ferrous sulphates. As is apparent from this flow sheet, acid ferrous sulphate solutions are oxidized with sulphites and air while neutral ferrous sulphates are oxidized with bisulphites and air, each of these two treatments requiring a different arrangement of equipment and in one instance, namely, evaporation, different types of equipment are required. The principles of each modification are shown by the following reactions:

For acid ferrous sulphates oxidized with sulphites, for example, ammonium sulphite and air, the reaction is—

16. 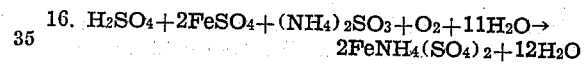

For neutral ferrous sulphates oxidized with bisulphites, for example, ammonium bisulphite and air, the reaction is—

17. 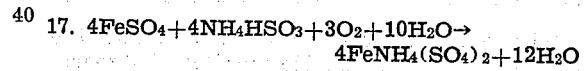

These reactions give, for both modifications of the process, the relations by weight of the various reagents required to form the ferric alum desired and form the basis for the control of the free acid, the quantities of sulphites or bisulphites required and the percentage of water to be left in solution prior to evaporation, which may be regulated as explained above for oxidation with sulphur dioxide and air.

The various steps in the process, as well as the modifications required to treat acid and neutral ferrous sulphate solutions are illustrated by Figure 2, which is a flow sheet giving the steps in the processing of acid ferrous sulphates (left) with sulphites and air, for example, ammonium sulphite and air, and the processing of neutral ferrous sulphate (right) with bisulphites and air. In this flow sheet, 27 represents a vat for pickling steel; 28 a storage and filtering tank to remove foreign matter from the spent pickling acid; 28A a storage tank for acid ferrous sulphate from any source, and 28B a storage tank for neutral ferrous sulphate from any source. From these tanks the acid solutions are conducted through acidproof pipes to their respective oxidation chambers, 30 and 30A, as required.

From reaction 16 it will be observed that the acid in the solution should be approximately one-third of the ferrous sulphate by weight, but I have found that solutions containing less than this proportion of acid may be used by continuing this treatment beyond the point at which all the iron is oxidized, the ammonium sulphite being oxidized to sulphate when it is conducted into the solution after this point has been passed. Therefore, I continue the treatment with diffused air, admitting the sulphite gradually until the iron is all oxidized and tests show that the iron and ammonia are in proper proportions to form ferric ammonium alum, then stop the addition of sulphite and continue the air flow until a test indicates all the sulphite has been oxidized. The oxidized solution is then permitted to flow to a spray dryer 33 and 33A in which the water in excess of that required for crystallization is evaporated with heated air or other hot gases of an oxidizing nature. From the evaporator, the saturated solution is conducted to crystallizing tanks 34 and 34A, where the liquor is cooled and the salts permitted to crystallize. The crystals are then collected and dried in a centrifugal type dryer, while the mother liquor is returned to the dryer or collected in a special storage tank for treatment separately.

In treating neutral ferrous sulphate solutions, this procedure may be changed and the excess water evaporated in a multiple effect evaporator 33B before the solution is oxidized. After evaporation of the excess water, the solution is conducted to an oxidizing cell 30B, similar in every respect to 30 and 30A, used to oxidize acid ferrous sulphate solutions. In this chamber, diffused air is admitted at the bottom and the sulphite, for example, ammonium bisulphite, is fed in gradually until all the iron is oxidized. This treatment automatically gives the salts in proper proportion to form ferric ammonium alum, as shown by reaction 17. The solution is then transferred to a crystallizer and cooled, when the salts are recovered and dried by centrifuging as described above for other modifications of the process.

For the purpose of oxidizing ferrous sulphate in solution, in accordance with the present process, the similarities as well as the differences in the reactions obtained with $SO_2$ and air, $H_2SO_3$ and air, or sulphites, such as ammonium sulphites, and air, are briefly and simply explained as follows:

First, it is noted that the oxidation of ferrous sulphate $2FeSO_4$ to ferric sulphate $Fe_2(SO_4)_3$ amounts to changing the valence of iron from 2 to 3 and that this change may be effected in two ways, namely, by combining three molecules of ferrous sulphate and removing one atom of iron from the group, as in reaction 18 below, or by combining two molecules of the salt and adding one $SO_4$ radical as in reaction 19:

18. $6FeSO_4 + 3O + 3H_2O = 2Fe_2(SO_4)_3 + 2Fe(OH)_3$
19. $2FeSO_4 + H_2SO_3 + 2O = Fe_2(SO_4)_3 + H_2O$

According to the prior art, reaction 19 above is represented by reaction 19a below, which is also the reaction employed in the present process, and set forth in the specification to show the relation of the present invention to the prior art, it being understood that a disclosure is not necessarily a scientific exposition.

19a. 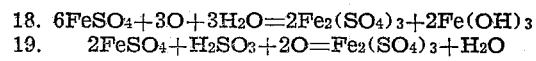   $2FeSO_4 + SO_2 + O_2 = Fe_2(SO_4)_3$

Either of these reactions may be used to oxidize ferrous sulphate, but since it is desired in the present invention to avoid the formation of a precipitate as a product of the oxidation, I employ the second reaction 19 above, substituting sulphites, specifically sodium or ammonium sulphite or bisulphite, for the sulphurous acid. Incidentally, these reactions express one of the fundamental differences between the present process and the processes of the prior art.

Comparing the action of these sulphites with that of sulphurous acid, it is noted that all three of these ionize as follows:

20. $H_2SO_3 \rightarrow H^+ + H^+ + SO_3^{--}$
21. $NH_4HSO_3 \rightarrow H^+ + NH_4^+ + SO_3^{--}$
22. $(NH_4)_2SO_3 \rightarrow NH_4^+ + NH_4^+ + SO_3^{--}$ From these ionization reactions, it is apparent that the active agent in the oxidation of ferrous sulphate, in accordance with reactions 19 and 19a is $SO_3$, which must first be oxidized to $SO_4$ by taking oxygen from the air used, a reaction which is catalyzed by ferric sulphate, manganic sulphate, vanadic sulphate, and possibly other sulphates of the heavy metals. It is, therefore, the free nascent $SO_4$ radical which is capable of uniting, and does so unite, with two molecules of ferrous sulphate to form ferric sulphate.

But, whereas the fundamental chemical principle underlying the oxidation of ferrous sulphate by sulphurous acid and by the sulphites, both acting in conjunction with atmospheric oxygen, it is the same, all three of the former reagents present certain differences that are important in the practice of the process of the present invention, which differences may be listed briefly as follows:

1. The oxidation of acid solutions of ferrous sulphate with sulphurous acid and air progresses slowly or not at all if the acidity is high, and in the oxidation of neutral solutions (pH 2 to pH 4) some sulphuric acid is formed as the ferrous sulphate is oxidized.

2. With ammonium sulphite, or bisulphite, highly acid solutions of ferrous sulphate may be oxidized, because the sulphite first reacts with the free acid, liberating sulphurous acid and forming ammonium sulphate by one of the following reactions:

23. $2H_2SO_4 + (NH_4)_2SO_3 \rightarrow 2NH_4HSO_4 + H_2SO_3$
24. $H_2SO_4 + 2(NH_4)SO_3 \rightarrow (NH_4)_2SO_4 + H_2SO_3$
25. $H_2SO_4 + NH_4HSO_3 \rightarrow NH_4HSO_4 + H_2SO_3$
26. $H_2SO_4 + 2NH_4HSO_3 \rightarrow (NH_4)_2SO_4 + 2H_2SO_3$ In these reactions, the amount of free acid present determines whether acid or neutral ammonium sulphate is formed.

3. With neutral ferrous sulphate solutions, that is, solutions of pH 4 to pH 5, ammonium sulphite precipitates some iron as ferric hydrate, while ammonium bisulphate gives no precipitate. Although the ferric hydrate may be dissolved, I prefer to prevent its forming in order to avoid danger of forming an almost insoluble basic ferric sulphate. The oxidation of acid and neutral ferrous sulphate solutions with ammonium sulphite and bisulphite are represented by reactions 16 and 17.

4. After all the ferrous sulphate has been oxidized in a given batch of solution with ammonium sulphite, I may, in the operation of the process, continue the feeding of the latter and of diffused air to control the amount of ammonium sulphate formed in relation to the quantity of free acid and ferrous sulphate originally present because the sulphite itself is then oxidized to ammonium sulphate thus:

27. $2(NH_4)_2SO_3 + O_2 \rightarrow 2(NH_4)_2SO_4$

5. The substitution of the ammonium sulphites for sulphur dioxide has other outstanding advantages also. For example, the burning of pyrites or other sulphur-bearing compounds, and even sulphur itself, presents difficulties in that the mixtures of $SO_2$ and air are very corrosive, the gases are laden with dust that clogs diffusers, and obviously all parts of a plant must operate in unison.

By the present process all of these difficulties are overcome, for there must be absorbed the $SO_2$ from the products of combustion of the sulphur-bearing compounds with dilute solutions of ammonia which may be built up to any concentration desired, because the ammonium sulphites are very soluble in water. These solutions may be prepared, stored, and used as required, independent of the production and oxidation of ferrous sulphate. Use of ammonia in this way to obtain the ammonium sulphites also increases the sources of sulphur dioxide from which the operator may draw to operate the process, because he may thus use ammonia to remove the sulphur dioxide from stack gases produced in furnaces burning coal or other high sulphur fuels. Dusts collected by the sulphite solutions do not interfere seriously in the present process because they are separated easily from the solution and, if not separated, they will not clog the apparatus employed, since applicant feeds these solutions to his oxidizing chambers through tubes with relatively large openings. Instead of ammonia, sodium hydroxide or carbonate may be used to absorb sulphur dioxide for the direct production of ferric sodium alum.

It may be mentioned in this connection that the present process opens up the possibility of using ammonia for removing sulphur dioxide from stack gases, since the present process opens up an important source of disposal of the sulphite liquors, the disposal of which heretofore presented a difficult problem.

It may be noted in this connection regarding the term base or bases as employed in the following claims that a base, in general, is a substance which is capable of decreasing the hydrogen ion concentration of solutions as distinguished from acids which increase the hydrogen ion concentration. Bases that form soluble sulphates and also are capable of precipitating ferric ions are the hydroxides and carbonates of ammonium, lithium, sodium, potassium, magnesium, zinc, and nickel, so that all those citations of record that use calcium hydroxide or calcium carbonate or other base forming insoluble sulphates, such as barium, cannot be regarded as anticipatory of the present invention because they change the principles of the process and the nature of the products obtained.

Having described in detail the various modifications that may be made in the process of my invention, I desire to add that numerous minor changes may be made in the procedure of carrying out the process without exceeding the scope of the invention as defined by the following claims.

I claim:

1. In the manufacture of commercially pure ferric alums by reaction of ferrous sulphate solutions and a suitable base, the process which includes the steps of adjusting the acidity of the solution to between approximately pH2 and pH4 by the addition of the said base, oxidizing the ferrous sulphate to ferric sulphate by treating the solution at a temperature between 45° C. and 70° C. with diffused air and a compound of the class consisting of sulphites and sulphur dioxide, continuing this operation with the gradual addition of the base until the sulphate of this base and the ferric sulphate are in proper proportion to form alum, evaporating a major portion of any excess water present, cooling the solution to effect crystallization and finally separating the crystals from the mother liquor.

2. In the manufacture of commercially pure ferric alums by reaction of ferrous sulphate solutions and a suitable base, the process which includes the steps of adjusting the acidity of the solution to between approximately pH2 and pH4 by the addition of the said base, oxidizing the ferrous sulphate to ferric sulphate by treating the solution at a temperature between 45° C. and 70° C. with diffused air and sulphur dioxide, continuing this operation with the gradual addition of the base until the sulphate of this base and the ferric sulphate are in proper proportion to form alum, evaporating a major portion of any excess water present, cooling the solution to effect crystallization and finally separating the crystals from the mother liquor.

3. In the manufacture of commercially pure ferric alums by reaction of ferrous sulphate solutions and a suitable base, the process which includes the steps of adjusting the acidity of the solution to between approximately pH2 and pH4 by the addition of the said base, oxidizing the ferrous sulphate to ferric sulphate by treating the solution at a temperature between 45° C. and 70° C. with diffused air and the sulphite of the said base, continuing this operation with the gradual addition of the base until the sulphate of this base and the ferric sulphate are in proper proportion to form alum, evaporating a major portion of any excess water present, cooling the solution to effect crystallization and finally separating the crystals from the mother liquor.

4. In the manufacture of commercially pure ferric alums by reaction of ferrous sulphate solutions and a suitable base, the process which includes the steps of adjusting the acidity of the solution to between approximately pH2 and pH4 by the addition of the said base, oxidizing the ferrous sulphate to ferric sulphate by treating the solution at a temperature between 45° C. and 70° C. with diffused air and a compound of the class consisting of sulphites and sulphur dioxide until alum is formed, crystallizing the alum in the solution and then separating the crystals from the mother liquor.

5. In the manufacture of commercially pure ferric alums by reaction of ferrous sulphate solutions and a suitable base, the process which includes the steps of adjusting the acidity of the solution to between approximately pH 2 and pH 4 by the addition of the said base, oxidizing ferrous sulphate to ferric sulphate by treating the solution at a temperature between 45° C. and 70° C. with diffused air and sulphur dioxide until alum is formed, crystallizing the alum in the solution and then separating the crystals from the mother liquor.

6. In the manufacture of commercially pure ferric alums by reaction of ferrous sulphate solutions and a suitable base, the process which includes the steps of adjusting the acidity of the solution to between approximately pH 2 and pH 4 by the addition of the said base, oxidizing the ferrous sulphate to ferric sulphate by treating the solution at a temperature between 45° C. and 70° C. with diffused air and the sulphite of the said base until alum is formed, crystallizing the alum in the solution and then separating the crystals from the mother liquor.

7. In the manufacture of commercially pure ferric alums, ammonia and ammonium hydroxide by reaction of ferrous sulphate solutions, ammonia, and a suitable base, the process which includes the steps of adjusting the acidity of the solution to between approximately pH 2 and pH 4 by the addition of ammonia, oxidizing the ferrous sulphate to ferric sulphate by treating the solution at a temperature between 45° C. and 70° C. with diffused air and a compound of the class consisting of ammonium sulphite and sulphur dioxide until ferric ammonium sulphate is formed, then adding the said base to form alum, heating the resulting solution to drive off the ammonia as a gas or vapor and then recovering the alum and the ammonia by conventional methods of condensing and compressing.

8. In the manufacture of commercially pure ferric alums, ammonia and ammonium hydroxide by reaction of ferrous sulphate solutions, ammonia, and a suitable base, the process which includes the steps of adjusting the acidity of the solution to between approximately pH 2 and pH 4 by the addition of ammonia, oxidizing ferrous sulphate to ferric sulphate by treating the solution at a temperature between 45° C. and 70° C. with diffused air and sulphur dioxide until ferric ammonium sulphate is formed, then adding the said base to form alum, heating the resulting solution to drive off the ammonia as a gas or vapor and then recovering the alum and the ammonia by conventional methods of condensing and compressing.

9. In the manufacture of commercially pure ferric alums, ammonia and ammonium hydroxide by reaction of ferrous sulphate solutions, ammonia, and a suitable base, the process which includes the steps of adjusting the acidity of the solution to between approximately pH 2 and pH 4 by the addition of ammonia, oxidizing the ferrous sulphate to ferric sulphate by treating the solution at a temperature between 45° C. and 70° C. with diffused air and ammonium sulphite until ferric ammonium sulphate is formed, then adding the said base to form alum, heating the resulting solution to drive off the ammonia as a gas or vapor and then recovering the alum and the ammonia by conventional methods of condensing and compressing.

CHARLES B. FRANCIS.

REFERENCES CITED

The following references are of record in the file of this patent:

UNITED STATES PATENTS

| Number | Name | Date |
| --- | --- | --- |
| 230,303 | Marsh | July 20, 1880 |
| 304,260 | Carey et al. | Aug. 26, 1884 |